United States Patent [19]
Bosc et al.

[11] 3,725,923
[45] Apr. 3, 1973

[54] COHERENT DIGITAL PULSE DOPPLER RADAR SYSTEM WITH IMPROVED SIGNAL HANDLING CAPACITY

[75] Inventors: Henri J. Bosc, Paris; Michel G. M. Castets, Meudon; Jean-Claude A. Debuisser, Fontenay-le-Fleury, all of France

[73] Assignee: International Standard Electric Corporation, New York, N.Y.

[22] Filed: July 6, 1971

[21] Appl. No.: 159,987

[30] Foreign Application Priority Data

July 7, 1970 France ..............................70/25146

[52] U.S. Cl.................................343/7.7, 343/5 DP
[51] Int. Cl.............................................G01s 9/42
[58] Field of Search.............................343/5 DP, 7.7

[56] References Cited

UNITED STATES PATENTS

| | | | |
|---|---|---|---|
| 3,343,162 | 9/1967 | Evans | 343/7.7 |
| 3,631,488 | 12/1971 | Evans | 343/7.7 |
| 3,680,096 | 7/1972 | Bosc | 343/7.7 |

*Primary Examiner*—T. H. Tubbesing
*Attorney*—C. Cornell Remsen, Jr. et al.

[57] ABSTRACT

A pulse Digital Doppler coherent MTI radar system in which sine and cosine phase detector outputs are both coded and stored in a plurality of range increments. A first channel stores digital codes for moving targets exceeding a minimum predetermined amplitude threshold. That information is used to control another MTI channel to reduce the number of target signals which must be processed in a second channel, thereby providing increased processing time. Storage of signal codes is effected in dual memories, one being read while real time storage is carried out in the other.

The sine and cosine phase detector output processing facilitates derivation of target velocity and sense. A Fourier transform display depicts Doppler component content in selected signals, the latter being controlled by bearing as well as range increment data.

5 Claims, 16 Drawing Figures

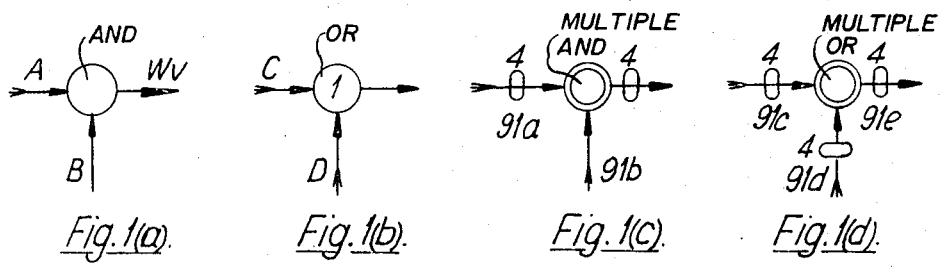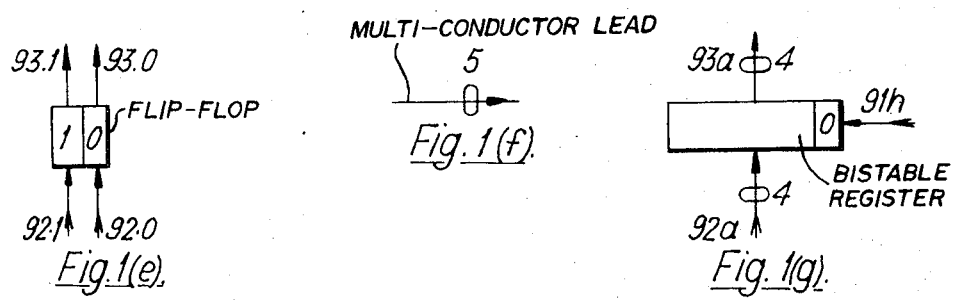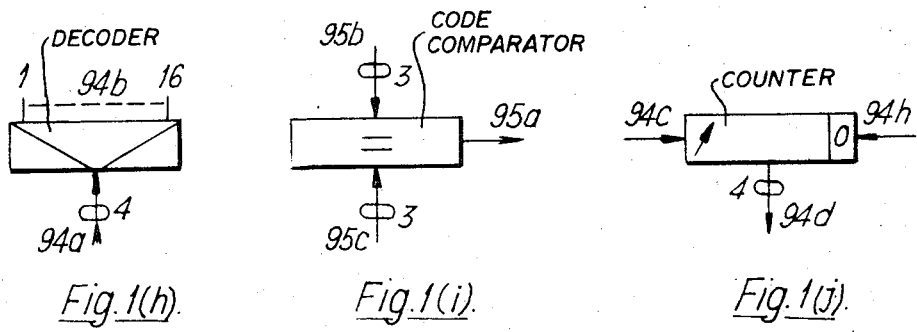

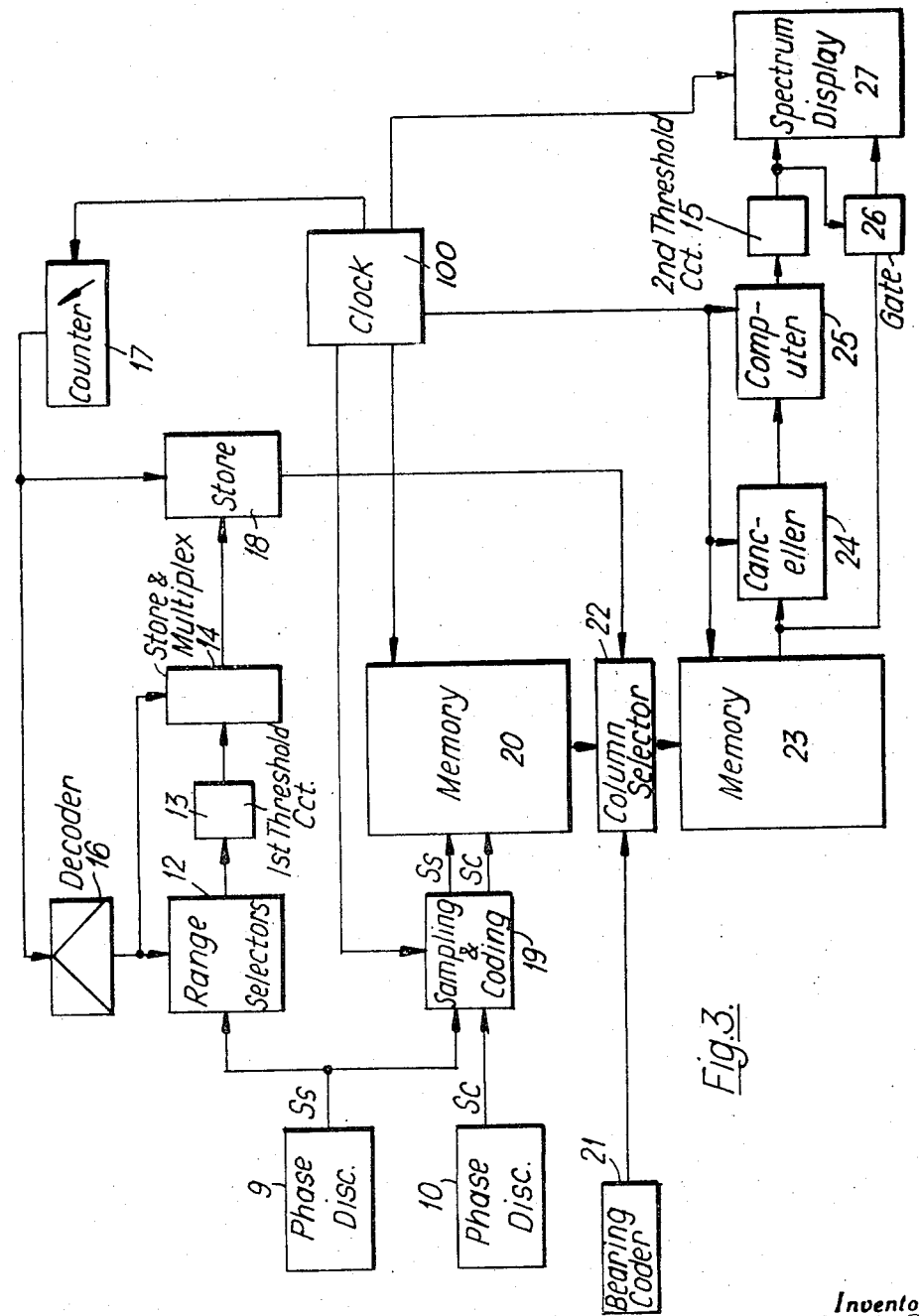

COHERENT DIGITAL PULSE DOPPLER RADAR SYSTEM WITH IMPROVED SIGNAL HANDLING CAPACITY

CROSS REFERENCE TO RELATED APPLICATIONS

This application is filed under the provisions of 35 U.S.C. 119 with claim for the benefit of the filing of an application covering the same invention filed July 7, 1970, Ser. No. 70 25146, in France.

BACKGROUND OF THE INVENTION

1. Field of the Invention

The present invention relates to improvements to coherent pulse Doppler radars and, more particularly, to radars of this type with inconstant pulse repetition frequency.

2. Description of the Prior Art

Moving target electromagnetic detection systems which make it possible to separate moving targets from fixed targets, utilizing the Doppler effect, are known. Particularly, in electromagnetic detection systems which transmit pulses, use is made of the variations of phase shift between the transmitted wave and the received echo wave, from one repetition period to the next. In such systems, the transmitted wave phase is stored or remembered during each repetition period and then compared with the phase of the echo signal energy. That relative phase shift is constant from one repetition period to the next for returned waves after reflection from fixed targets, while it varies linearly versus time in the case of returned waves after reflection from a target moving with a radial velocity greater than zero with respect to the antenna. A phase detector connected to compare the said remembered phase reference signal for each repetition period with the received signals produces constant amplitude pulses corresponding to fixed targets and pulses whose amplitude varies sinusoidally at a frequency $fd$ (generally called Doppler frequency) corresponding to moving targets. The said $fd$ depends on the radial velocity $V$ of a given moving target and on the transmitted wave length, according to the formula $fd = 2 V/\lambda$.

The spectrum of the constant amplitude pulses corresponding to fixed targets consists of spaced lines at frequencies $F, 2F \ldots, nF$, wherein $F$ is the transmitted pulse repetition frequency. The spectrum of pulses corresponding to moving targets comprises spaced lines of the type of $nF \pm fd$.

In order to make a discrete velocity determination, it is then necessary to know the returned signal spectrum for a corresponding moving echo. The location of the echo, i.e., its bearing and range, are not derived from the spectrum. The echo bearing is taken as the antenna bearing at the time of reception of the pulses and the echo range is determined by the time interval elapsed between the pulse transmission and the pulse reception.

In a coherent pulse Doppler radar, it is necessary to provide processing of the phase discriminator circuit output signal to recover range information. For this purpose, the signal is subdivided into jointed increments of range, each corresponding to the signal returned from a discrete area located at a predetermined distance from the radar. The signal in each such range increment or bin may then be analyzed for the presence or the absence of a moving echo, such a signal analysis consisting of examination of the signal spectrum. Various approaches are available for this type of analysis, one of these consisting of computation of the Fourier transform of the said signal.

In the case of coherent pulse Doppler radars with recurrent pulses at a frequency $F$, the spectrum width to be examined is about $F/2$ so that the number of points to be computed for obtaining an accurate spectrum is not too high. It is accordingly possible to perform those computations for all the scanned areas during an antenna rotation. As a matter of fact, if a radar is used which has the following characteristics:

period $T = 1/F = 533.3$ microseconds
antenna rotation speed : 120°/second
$m = 64$ range increments, and if it is assumed that it is necessary to receive 32 pulses from each range increment for enabling the computation of the spectrum of the signal returned from the said area, the number of elementary areas scanned during an antenna rotation will be 11,264. Accordingly, at least 30 points are needed to draw a nominally accurate spectrum. The number of points to be computed during an antenna rotation, i.e., in 3 seconds, will then be seen to be close to 340,000. From that, it follows that only 9 microseconds of computation time is available for each point. Although this is normally long enough for performing the computation of a spectrum point, the available time for performing the computation of a spectrum point is reduced if, still assuming that receiving 32 pulses for an elementary area (range increment) is necessary, the period $T$ is reduced, the antenna rotation speed is increased, the number $m$ of range interval is increased, or even if the number of points to be computed is increased.

Everything else being the same, the number of points to be computed inherently increases if the spectrum width to be examined increases. Thus, if a coherent Doppler radar which transmits pulses spaced by unequal time intervals is involved, the maximum Doppler frequency which it is possible to measure without ambiguity is definitely higher than in a uniformly recurrent pulse radar. Consequently, the number of points to be computed is higher. By way of example, if the maximum modulation deviation $\Delta T$ with respect to the mean period $Tm$ is on the order of 20 percent, and if the pulses are transmitted according to a periodic pattern of 20 pulses, the number of points to be computed for obtaining the spectrum of a signal returned from a discrete range increment will have to be higher than 2,000. With a non-uniformly recurrent pulse radar having the same characteristics as the previously defined recurrent pulse radar, particularly with $Tm = T$, the number of points to be computed during an antenna rotation of 3 seconds is higher than 22 million, i.e., a computation time shorter than 0.136 microsecond per point is indicated. In accordance with these prior art considerations, the nature of the problem solved by the present invention will be evident.

SUMMARY OF THE INVENTION

In accordance with the computing time limitation aforementioned, it may be said to be the general object of the present invention to provide a coherent Doppler radar signal processor facilitating the calculation of the Fourier transform of the echo signals in the case where the number of points to be computed is very high.

In a coherent pulse Doppler radar, the means implemented according to the invention, for performing the processing of the signal provided by the two phase discriminator circuits of the said radar, comprise a sampling and coding circuit for sampling and coding the instantaneous signal amplitudes delivered by the two phase discriminator circuits; first and second memories, operating alternately, for storing and reading, wherein are stored the binary words corresponding to $m$ range increments for $n$ successive repetition periods; a set of $m$ range selectors receiving the output signal from one of the two phase discriminator circuits and controlled in such a manner as to correspond to the range interval binary words stored in the first or in the second memory; a third memory for storing the range interval codes which, at the selector output, have delivered a signal higher than a certain threshold R2; an antenna bearing coding circuit; a fourth memory provided for storing the bearing code corresponding to the middle of the angular sector from which signals are being stored in the first and second memories; and fifth and sixth memories operating alternately for storing and reading, each provided for storing the binary coded words of the range increments for which codes have been stored in the third memory. The capacity of each fifth or sixth memory is such that it is possible to store signals as follows:

a. Range increment binary words concerning several consecutive angular sectors.
b. Codes of the said range increments.
c. Bearing codes of the corresponding angular sectors.

A fixed echo cancellation circuit receives the binary words extracted from the fifth or sixth memory and a computer circuit is connected to complete the frequency spectrum of the signals delivered by the fixed echo cancellation circuit. A circuit for handling and applying the bearing and range interval codes extracted from the fifth or the sixth memory reading operation operates only if the frequency spectrum computer circuit output signal is higher than a certain threshold R1 (such as R1 > R2), whereby for the memory system, but with a different false alarm probability. A clock circuit provides the various cyclic signals necessary for operating the processing device.

The above mentioned and other features and objects of this invention will become apparent by reference to the following description taken in conjunction with the accompanying drawings.

BRIEF DESCRIPTION OF THE DRAWINGS

FIGS. 1(a) to 1(j) show various symbols used in the FIGS. of the present application.

FIG. 3 shows, in block diagram form, the processing device according to the invention.

DESCRIPTION OF THE PREFERRED EMBODIMENTS

Figure 2:
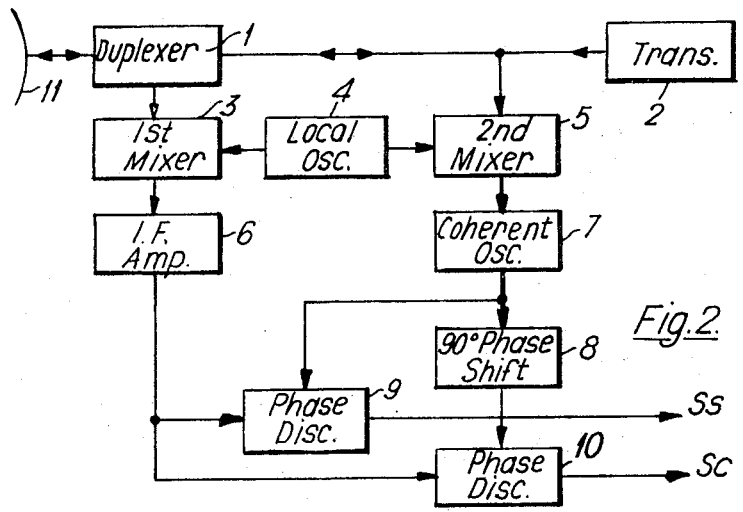
FIG. 2 illustrates the principles of a coherent pulse Doppler radar.

Before describing the circuit details of the present invention, the meaning of various specific symbols used in the drawings will be described with reference to FIGS. 1(a) through 1(j).

FIG. 1(a) shows an electronic coincidence gate, otherwise referred to simply as an AND circuit. The AND circuit provides a positive signal at its output $Wv$ when its inputs, A and B, each simultaneously receives a positive signal. The circuit thus performs the logic condition noted A.B.

The FIG. 1(b) shows an electronic mixer gate, (OR circuit), the output of which provides a positive signal when a positive signal is applied to one or more of its inputs C and D. This circuit thus performs the logic condition noted C + D.

FIG. 1(c) shows a multiple AND circuit, i.e., comprising, for example, a four channel AND circuit. Each channel has a first input connected to one of the leads 91a and a second input connected to a common lead 91b.

An AND circuit input will hereafter be considered as activated when a signal is applied to the said common input 91b and an AND circuit channel will be considered as opened when all its 91a inputs are simultaneously activated.

FIG. 1(d) shows a multiple OR circuit which, in the case of the example, comprises four OR circuits, each one having an input in 91c and another in 91d, making it possible to obtain on any of the four output wires 91e, the same signals as those applied to either corresponding input lead.

FIG. 1(e) shows a bistable circuit or "flipflop." A control signal is applied to one of its inputs 92–1 or 92–0 to cause it to assume the state 1 or the state 0 respectively. A voltage of the same polarity as the control signals results, either at the output 93–1 when the flip-flop is in the state 1, or at the output 93–0 when it is in the state 0. If the bistable circuit is referenced B1, the logic condition meaning is that it is in state 1, the state 0 being written $\overline{B1}$.

FIG. 1(f) illustrates the designation of multiconductor connection leads, five in the example shown.

FIG 1(g) represents a bistable register. In the specific form illustrated, it comprises four bistable circuits whose inputs 1 are connected discretely to leads of group 92a and whose outputs 1 are similarly connected to leads of group 93a. The figure "0" indicated at one end of the register, means that the corresponding register is reset when a signal is applied to a lead in 91h.

FIG. 1(h) shows typical decoder which, in the case of the example, translates a four bit binary code applied to the group of leads 94a into a 1 out of 16 code, i.e., a signal appears only on one lead among the sixteen leads in 94b for each discrete code word applied to the input 94a.

FIG. 1(i) shows a code comparator whose output 95a delivers a signal when the codes (3 bit in the example) applied to its inputs 95b and 95c are identical.

FIG. 1(j) shows a four bistable circuit counter which counts the pulses applied to its input 94c. The figure 0, indicated at one end of the counter means that the counter is reset when a signal is applied to the lead 94h. The bistable outputs 1 are connected to the output leads 94d (four in numbers shown).

It will be noted that, in the various figures accompanying the description, some electronic gates (AND circuits, OR circuits) do not bear any reference. Actually, each of these gates is identified without ambiguity in the description by the logic equation describing its function and by the number of the figure, the reference to every signal which is applied to it, being written near the corresponding input. Thus the AND circuit of the figure 1($a$) would be defined as the logic circuit delivering a signal W$v$ for the logic condition A·B in FIG. 1($a$). To describe these circuits in this manner is conventional and this art, detailed character reference being unduly cumbersome in these cases.

FIG. 2 shows a simple diagram of a coherent pulse Doppler radar of a conventional prior art type. It comprises an antenna 11 used for transmitting and receiving, a transmitter 2 delivering radio-frequency pulses, the said pulses being transmitted to the common transmission-reception antenna via a radio-frequency switch 1, better known under the name of "duplexer." The echo signals received in response to the transmitted pulses are directed by the switch 1 to a frequency converter circuit (first mixer) 3 which also receives the output signal from a local oscillator 4. The output signals of the circuit 3 are applied to an intermediate frequency amplifier 6. The output signal of the local oscillator 4 is also applied to a second frequency converter circuit 5 which also receives, during the transmitted radar pulse, the radio-frequency signal provided by the transmitter 2. The intermediate frequency output pulse of the frequency converter circuit 5 is, at the beginning of each radar repetition period, used for triggering the operation of the "coherent" oscillator 7, the said oscillator then delivering a signal at I.F. which has a fixed and predetermined phase relation with the phase of the transmitted R.F. pulse. At every repetition period, the said coherent oscillator 7 is so caused to operate as described, then stopped before the beginning of the next repetition period for referencing during the next transmitter pulse. The output signal of the coherent oscillator 7 is applied to a pair of phase discriminator circuits 9 and 10, directly for the discriminator 9, and via a 90° phase shifter circuit 8, for the discriminator 10.

These two phase discriminators 9 and 10, also receive the output signals of the intermediate frequency amplifier 6.

The phase discriminator circuits 9 and 10 provide for two orthogonal signal components at the Doppler frequency $fd$. It is known that these two components makes it possible to determine the direction (sense) of echo velocity, i.e., thereby to determine if the moving target which has generated the Doppler signal is approaching or retreating. Hereafter, in this description, the output signals of the phase discriminator circuits 9 and 10 will be respectively called S$s$ and S$c$.

FIG. 3 shows, in block diagram form, the circuit for processing, according to the present invention, the signals S$s$ and S$c$. It comprises sampling and coding circuits 19, a memory 20 (three dimensional core type for example) which makes it possible to store coded binary words during several repetition periods. The said memory 20 is organized in such a manner that the binary words in a column describe the "story" or "history" of a range increment. A set of range selectors 12 is followed by a first threshold circuit 13 and a storing and multiplexing circuit 14. A circuit 18 stores the range intervals which have contained a signal higher than the said threshold at 14. A counter 17 controls the storage unit 18 and, in parallel, feeds decoder 16, the function of which will be more evident as this description proceeds. The said decoder 16 effectively "programs" the examination of the echo returns through the span of ranges of interest by controlling 12 and 14.

An antenna bearing coding circuit 21 feeds coded bearing information to a circuit 22, the latter selecting the columns of the memory 20 which correspond to range increments which have delivered signal higher than the threshold. The selector 22 acts as a gate under control of 18 and 21 to admit above-threshold signals to memory 23. Thus, memory 23 stores digital words for those range increments containing signal higher than the said threshold and also stores codes of the antenna bearing from 21. A cancellor circuit 24 is provided for eliminating, from the selected range increments, those components resulting from fixed targets. Computer circuit 25 evaluates the frequency spectrum of signal returned from a range increment of interest. A second threshold circuit 15 controls a gate circuit 26, allowing the range increment and bearing codes to appear at the input of display 27, if the signal analyzed by the circuit 25 corresponds to a moving echo. Circuit 27 displays the said spectrum versus time and this resembles known cathode ray spectrum analyzers. The various cyclic signals needed for operating the circuits, which are digital in nature, are provided by the clock 100.

The operation of the processing circuit of the FIG. 3, as well as the details of its circuits, will be described in relation with the operation of a coherent pulse Doppler radar having non equidistant pulses transmitted according to a periodic pattern of $N = 32$ pulses with a pseudo-period $Tm = 512$ microseconds. The pulse duration will be considered as equal to 1 microsecond.

Hereinafter, $I_1 \ldots I_{32}$ will represent the 32 pulses of the said periodic pattern and $IT_1 \ldots IT_{32}$ will represent the 32 time intervals of the said pattern.

The signals S$s$ and S$c$ provided respectively by the phase discriminator circuits 9 and 10 are applied to the sampling and coding circuits 19 which, for every sample, deliver a code or binary number having $p = 9$ bits. In order that the discrimination and the range resolution be maximum, the sample pulses have a frequency $1/r = 1$ MHz. Every microsecond two binary numbers are supplied by the sampling and coding circuits 19 and are stored in memory 20. Indeed, as it will be seen in the FIG. 6, such a memory 20 comprises two identical memories A and B alternately operating for simultaneous writing and reading each memory is designed for storing the binary words obtained during the PRF program duration ($N$ = pulses).

The line selector circuits SL1 and SL2 (looking ahead to FIG. 6) and the column selector circuits SC1 and SC2 of the said memories are arranged so that the binary numbers coded during the time interval between two transmitted pulses (the repetition period) are stored along a discrete line of memory. Moreover, the binary words of succeeding repetition periods are similarly stored in succeeding memory lines of the same memory. When the 32 lines of a memory ($N = 32$) are filled up, the binary words of the next N repetition periods are stored in the other memory. While binary words are stored in one of these memories, for example the memory B, the selector circuits SL1 and SC1 of the memory A enable the reading, column by column, of the binary words stored in memory A. Each pair of binary words is displayed in the register 33, the stored binary words being read by couple. As a consequence of the storage mode in the memories A and B, the binary words of a column correspond to a single range increment located at a predetermined range from the radar antenna and it is said that the binary words of such a column give the "story" or "history" of a discrete range increment.

In the described particular example, only signals returned from a limited area are of interest, for example $m = 64$ range intervals, the said area starting at a predetermined distance from the radar which can be varied in order to move the area of interest. The processing of the binary words after the aforesaid reading will be hereafter described. The memory 20 is typically of the type described in French Patent 1,438,257.

Figure 4:
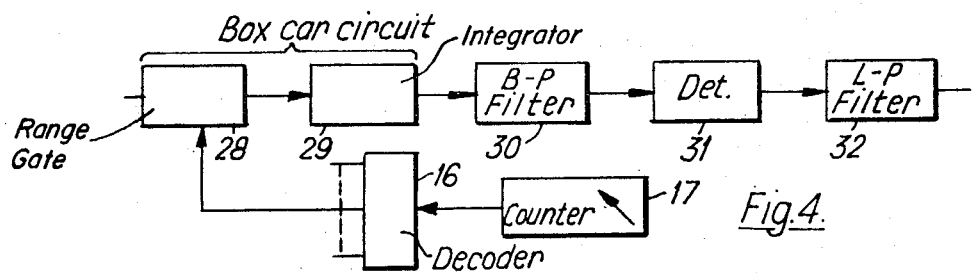
FIG. 4 illustrates a range selector.

One of the output signals of the phase discriminator circuits 9 and 10, for example the signal $Ss$, is applied to a set of ($m = 64$) range selectors. FIG. 4 shows the diagram of such a selector. It comprises a range gate 28 which is opened by pulses of duration $r$ which reproduce the pulse pattern, beginning at a delayed time with respect to the transmitted pulse pattern, to mark the beginning (in range) of the area of interest. The sampling pulse is delivered by the decoding circuit 16 (FIGS. 3 and 4). The range gate 28 is followed by a circuit 29 comprising a capacitor for integrating the current during the gate opening and then keeping its charge from one pulse to next. The assembly of the circuits 28 and 29 form a sampling device frequently referred to as a "box-car" circuit. The output signal of the circuit 29 is applied to a band-pass filter 30 constructed to pass only frequency components resulting from moving targets extant in the spectrum of the sampled signal. This filter pass-band is located between fc and $F/2$, the lower cut-off frequency fc being selected in such a manner as to suppress the components resulting from fixed targets and the upper limit being well below the repetition frequency. The filtered signal is applied to a detector circuit 31 and then to a low-pass filter 32 the 3db pass-band of which is equal to half the width at three decibels of a frequency spectrum line. It will be noted that simply applying the signal $Ss$ to the selector set does not make it possible to detect all the moving echoes unambiguously, since, when the signal $Ss$ is zero, the signal $Ss$ may be different from zero, in which case there is, in fact, a moving target echo signal is extant. To avoid that information loss, it is sufficient to apply the signal $Sc$ to a selector set identical to the set 12 (FIG. 3), controlled by the same signals, and then to combine the output signals of each selector pair associated with the same range increment in such a manner as to obtain the sum.

The output signals of the low-pass filters of the $m = 64$ range selectors are applied to a threshold circuit 13 followed by a circuit 14. The purpose of this is to store the codes of the selectors which have delivered a signal higher than the predetermined threshold R2 of the circuit 13. Circuit 14 also provides for transferring the contents of its memory into the circuit 18 which determines and stores the codes of the selectors which have provided a signal higher than the said threshold R2.

Figure 5:
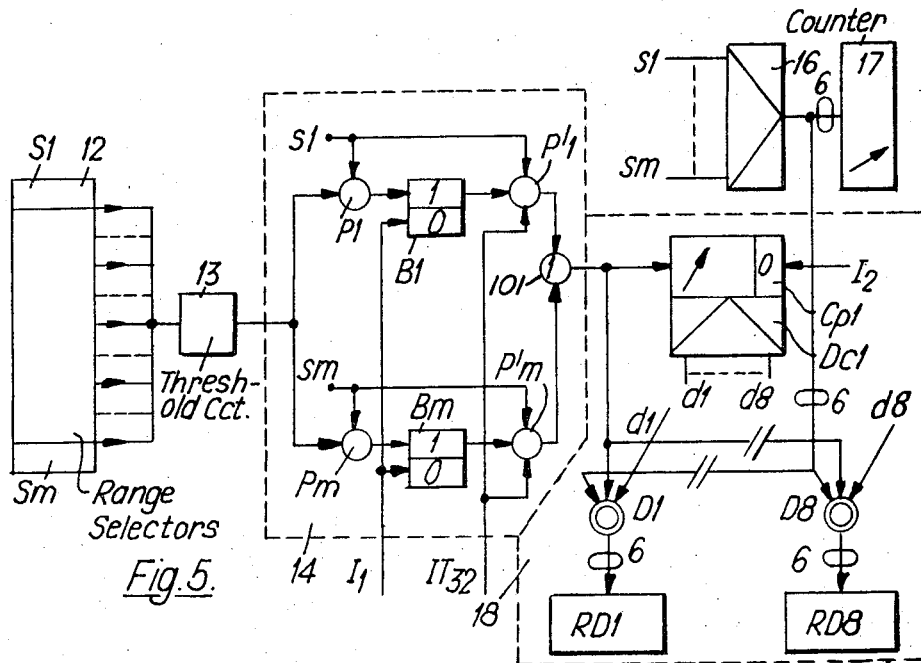
FIG. 5 shows the detailed diagram of the circuits 14 and 18 of FIG. 3.

FIG. 5 shows a specific embodiment of the circuits 14 and 18. In this figure, some elements of the arrangement of FIG. 3 are included, as will be apparent from the reference symbols. The outputs of the range selectors S1—S$m$ of the set 12 are connected to the threshold circuit 13. The output signal of the circuit 13 is applied to a set of AND circuits P1–P$m$ whose opening is controlled by the signals $s1$–$sm$, resulting from the decoding by the circuit 16 of the codes provided by the counter 17, the latter stepping forward for every pulse of frequency $1/r$ applied to it. The outputs of the AND circuits P1–P$m$ are connected respectively to the inputs 1 of the bistable circuits B1–B$m$ (which are turned to the state 1 if the output signal of the selector of the same order is higher than the threshold R2). Those bistable circuits are reset to 0 state at the beginning of every pattern (plurality of transmitter pulses comprising one psuedo cycle) by the first pattern pulse $I_1$.

The outputs 1 of the bistable circuits B1–B$m$ are respectively connected to one of the three inputs of the AND circuits P'1–P'$m$, the second input of the said AND circuits receiving an opening signal $IT_{32}$ during the duration of the 30-second time interval of the pattern. These AND circuits make it possible to scan the bistable circuits B1–B$m$ during the last time interval of the pattern. The signals resulting from such scanning are used to store the codes of the range intervals which have delivered a signal higher than the threshold R2 in the memory 18. It will be noted that the signals from the gates P1–P$m$ and P'1–P'$m$ are the same and that therefrom a spurous bistable circuit reading is possible during a writing time. However, that false operation corresponds to the detection of the beginning of an echo during the 30-second time interval of the pattern and the fact that it is not detected is not significant since it will be detected during the next pattern of pulse repetition period variation (psuedo cycle).

The memory 18 comprises a series of registers RD1–RD8 having six positions, a series of multiple AND circuits D1–D8, a counter (by eight) C$p$1, and a decoder circuit Dc1 which provides the signals $d1$–$d8$. Each of the multiple AND circuits D1–D8 comprises three inputs; one connected to the outputs of the AND circuits P'1–P'$m$ via the OR circuit 101, another connected to an output of the decoder circuit Dc1 and a third connected to the group of six output leads of the counter 17. During the last time interval of the pattern, every signal provided by the AND circuits P'1–P'$m$ makes it possible to store (in one of the registers RD1–RD8 selected by the decoder circuit Dc1) the range interval code displayed by the counter 17 and, also (after a predetermined delay introduced by the circuit Dc1) to select the next register. The counter C$p$1 is reset by the pulse $I_2$ and the decoder Dc1 then provides a signal $d1$.

It is clear that if, during the duration of a complete pattern, more than eight range intervals have each provided a signal higher than the threshold, the signals provided after the storage of the eighth register RD8 need not be taken into consideration. However, such an event is very improbable because taking into account eight echoes per pattern, that is to say per period of about 16 milliseconds, corresponds to having eight echoes in an angular sector of less than 2° and a range of about 10 kilometers, in assuming an antenna rotation speed of 120° per second.

Figure 6:
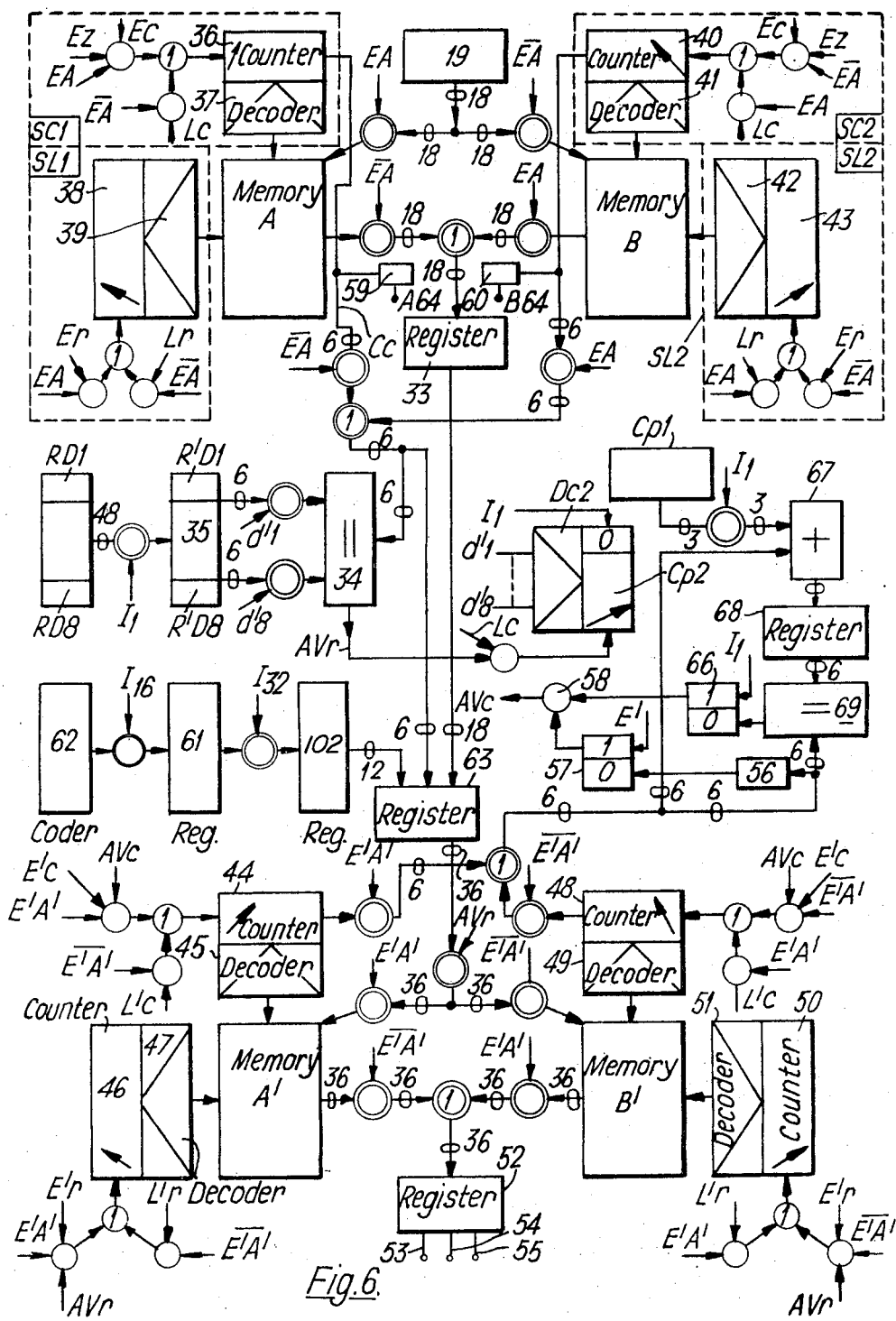
FIG. 6 shows the detailed diagram of circuits 20, 21, 22 and 23 of FIG. 3.

The signals received during the 30-second and last time interval of the pattern are stored under the form of binary words in the last line of the memory A or B (FIG. 6) in the storing process of, for example, memory A. The signals received during the next repetition period, which corresponds to the first period of the next pattern, are stored in the memory B and the memory A concurrently starts to be read. Such reading is, again, performed column by column starting with the first increment, which corresponds to the nearest range increment. In each column, the reading is effected line-by-line. After every elementary reading operation, two binary words are stored in the output register 33 of those memories (FIG. 6). When this pair of binary words corresponds to the range interval in which a code is displayed in one of the registers RD1–RD8 of the circuit 18 (FIGS. 3 and 5) it is registered in the memory A' or B' (FIG. 6) whichever is in the storing process. The selection of the columns to store in the memory A' is obtained by a comparator 34 which receives, on the one hand, the code of the column in reading process provided by the selection circuit SC1 and, on the other hand, the code of the range increment provided by the register R' D1 of the circuit 35. The said circuit 35 comprises eight registers R'D1–R'D8 similar to the registers RD1–RD8 of the circuit 18 (FIGS. 5 and 6). The transfer of the content of the registers RD1–RD8 into the registers R'D1–R'D8 is performed at the transmission time of the first pattern pulse $I_1$. This pulse $I_1$ is the one which resets the counter $Cp2$. Next, the decoder $Dc2$ provides the signal $d'1$ which selects the particular register R'D1, the content of which is compared with the content of the counter 36 via the comparator 34. If there is identity, the said comparator provides a signal AVr which causes the line counter 46 of the memory A' to step at the rate of the signals E'r. The counter $Cp2$ then also steps at the rate of the signals Lc as memory A' stores the content of the register 63. The said register contains the pair of binary words extracted from the memory A as well as the codes which define the range interval and the corresponding bearing.

The bearing code is provided by a register 102, the code which it contains being the antenna bearing code at the time of the sixteenth pattern pulse. The antenna angular position is continuously coded by a circuit 62 and, at the time of the pulse $I_{16}$ of the pattern, the code provided by the coder 62 is transferred into the register 61, and then into the register 60 at the time of the pulse $I_{32}$.

If the bearing codes have 12 digits, the register 63 will include $18 + 6 + 12 = 36$ bistable circuits and thirty-six digits will then be simultaneously stored in the memory A', which will therefore have 36 planes. The number of lines per plane is obviously equal to the number of lines of the memory A, but the number of columns may be variable.

It will be realized that the number of columns in the memories A' and B' is such that the maximum number of echoes which can be detected by the circuits 14 and 18, associated with the selector set 12 during a predetermined time cannot be stored in the said memories. Thus there is the possibility of information loss. Such a limitation results in stopping the information transfer between the memory A or B and the memory A' and B' as soon as those latter are filled. Also it is necessary to read only at regular time intervals of duration greater than that which would be required for filling up a memory assuming that, for every psuedo pattern, all the registers RD1–RD8 (FIGS. 5 and 6) are utilized.

According to the present invention and the specific example described herein, the number of the columns in the memories A' and B' is 64 and the time interval spacing successive readings in a column is of about 2 seconds, i.e., a memory reading time of about 1 second. If the antenna rotation speed is of 120° per second, the latter limitation means that 64 echoes can be processed in an angular sector of 120° having a range depth of 10 kilometers. It is understood that an echo density of 64 per sector of 120° and range depth of 10 kilometers is improbably high and, consequently, there will substantially be no information loss in the practical sense.

In the block diagram of FIG. 6, the storage "occupied" or stop signal in memory A' or B' is obtained by terminating the signal AVc. That signal AVc is normally present only when and until the column counter of the memory under storage process has not reached the maximum count. The column code is applied to a circuit 56 which provides a reset signal to turn the bistable circuit 57 to the state 0 when the 64th column is selected. The AND circuit 58 is then closed. The bistable circuit 57 is turned to the state 1 by a signal E' which consists of recurrent pulses appearing in synchronism with the rising edges of the signals E'A' and $\overline{E'A'}$.

It will be noted that the memories A' and B' are minimally used, since, for each of the 32 orthogonal pairs of binary words of a range increment, the same range increment identification and the same bearing code will be stored. For this reason, it is of interest to split each memory A' or B' into two memories, one provided for storing the properly read signals and the other for storing the position codes to the extent of one position code (range + bearing) per range increment. Each of these two memories provided for storing the position codes is, for example, constructed in the form of a plane of 64 columns and 18 lines, the column selection being made by means of a counter 44 or of a counter 48.

The stepping of the column counter 44 and of the column counter 48 of the memories A' and B' during storage is obtained through circuits 67, 68, 69 and 66. The circuit 67 is an adder which adds, at the beginning of every pattern, the binary numbers which define the discrete column of memory A' and B' which has been selected for storage during the previous pattern, and also the total number of range intervals of interest; i.e., the number of columns to be stored in the memory A' or B' during the pattern in process. Those binary numbers are provided by the column counter 44 or 48 and by the counter $Cp1$ (FIGS. 5 and 6) The binary number resulting from the addition is stored in the register 68 to be compared to the column code of the memory in the storing process via comparator 69. The output signal of this comparator is applied to the input 0 of a bistable circuit 66 which is turned to the state 1 by the initial pattern pulse $I_1$. After the pulse $I_1$, the bistable circuit 66 provides a signal AVc which causes the column counter to step at the rate of the signal E'c as long as the codes compared by the comparator 69 are not equal.

After a time interval equal to 64 patterns, defined by the signal E'A', there will be storage in the memory B' and contemporaneous reading of the memory A'. Such reading is performed, column by column, and in every column, line by line, so that every pair of binary words as well as the position codes are displayed in the register 52. The said register includes three output lead groups; a first group 53 corresponding to the binary word of signal Ss, a second group 54 corresponding to the binary word of signal Sc, and finally, a third group 55 corresponding to the position code (range interval + bearing).

Figure 7:
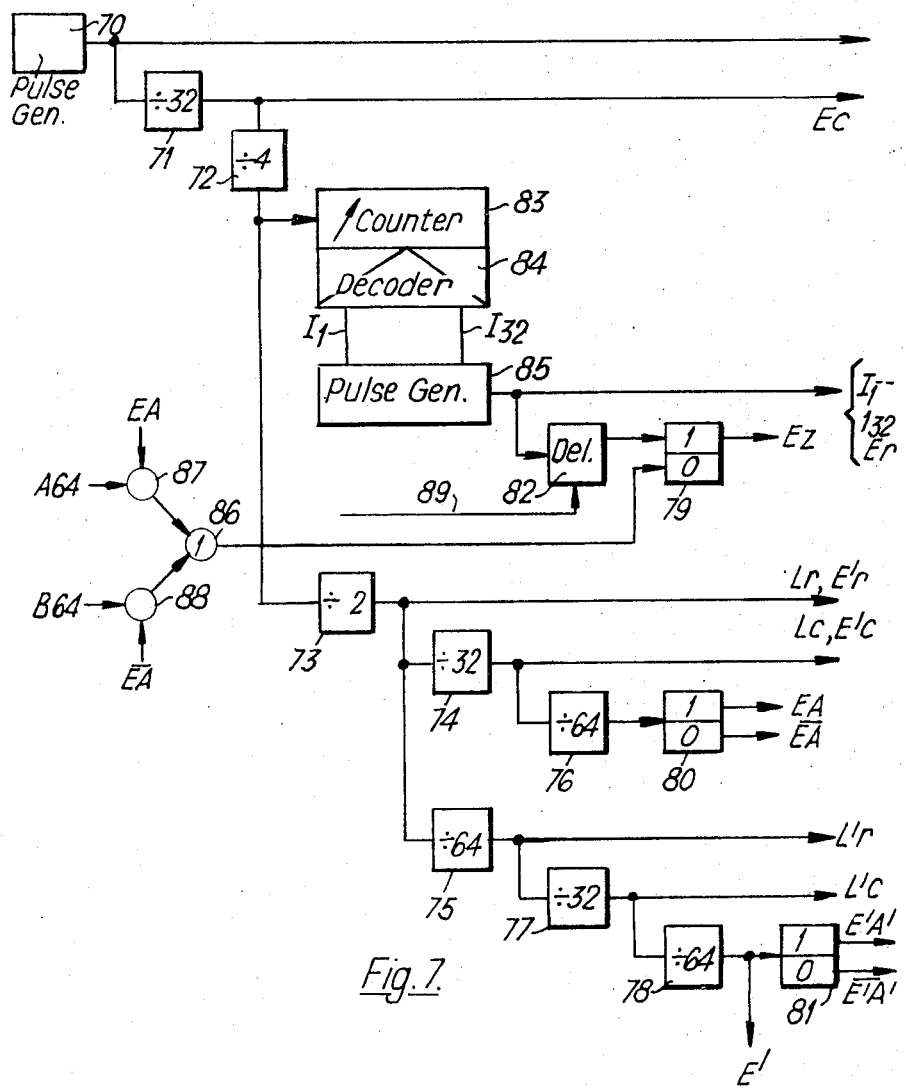
FIG. 7 illustrates an embodiment of the clock circuit whose output signals cause the circuits of FIG. 6 to operate.

The signals needed for operating the circuits of FIG. 6 are provided by a clock circuit of which FIG. 7 shows an example or typical instrumentation. It comprises a pulse generator 70 providing, for example, pulses at the frequency of 32 megahertz which are used for the basic coding, frequency divider circuits 71–78, bistable circuits 79–81, a counter 83, a decoding circuit 84, a pulse generator 85 for the transmitted pulses $I_1$–$I_{32}$, a delay circuit 82 for the said transmitted pulses, and electronic gates 86–88.

The $N = 32$ pulses of the transmission pattern are obtained via a counter 83 having 4,096 positions, assuming that the greatest common denominator of the time intervals is 4 microseconds. To this counter is connected a decoding circuit 84 which decodes 32 specific codes of which the signals provide the 32 pulses of the pattern. A circuit 85 performs the parallel-series conversion of the said pulses. To make possible the scanning of any area, a variable delay circuit 82 controlled at its input 89 is provided along with a bistable circuit 79. This bistable circuit is turned to the state 1 by the delayed transmitted pulse and provides then the signal Ez which makes possible the storage of the binary words provided by the circuit 19. The storage is terminated when the column counter of the memory under storage process reaches the position 64, signals A64 and B64 provided by the decoding circuits 59 and 60 and corresponding respectively to the memories A and B (FIG. 6).

As the effective storage time in the memories A and B is substantially shorter than the mean time interval between the transmitted pulses, with a ratio of 8 in the particular example herein described, the rate of reading the lines of a column of the said memories may be eight times lower than the rate of storage of the columns of a line. This is facilitated by the frequency dividers 72 and 73. (See clock circuit - FIG. 7). Since a column comprises 32 lines, the stepping signal Lc for the column counter during reading is obtained by dividing the line stepping signal Lr by 32 in a circuit 74.

If no buffer memory is used between the memories A and B, or between memories A' and B', the stepping signals E'r and E'c for the line counters and column counters, respectively, of the memories A' and B' (during the storage process) will be identical to the signals Lr and Lc respectively.

The signals Ea and $\overline{Ea}$, which control the alternate operation of the memories A and B, are obtained from a divider circuit 76 whose output signal controls the bistable circuit 80.

As previously mentioned, the sorting of the useful information is performed in two phases, as follows: In a first phase via the circuits 14 and 18 (FIGS. 3 and 5) and in a second phase via the memories A' and B'. The capacities of these memories are limited to the storage of 64 useful echoes per second, whereas the circuits are capable of detecting 512 useful echo signals per second. This second limitation results from reading each memory A' or B' only every 2 seconds approximately, as hereinbefore outlined.

The reading signals L'r and L'c then have a frequency such that each memory A' or B' is read in about 1 second. Accordingly, the L'r pulses have a period of 512 microseconds while the L'c pulses have a period of 16.384 milliseconds. The signals E'A' and $\overline{E'A'}$ are obtained, from the signal L'c, via the divider circuit 78 and the bistable circuit 81.

FIGS. 6 and 7 have been described in conjunction with a typical embodiment wherein each memory comprises a counting circuit for the lines and a counting circuit for the columns, the said circuits being supplied by stepping signals from the clock circuit of FIG. 7. It will be realized that various other arrangements might be implemented, particularly wherein the memories comprise only the selection circuits, the said circuits receiving the address codes provided either by a storage counter or by a reading counter, depending on the operation to be performed in the said memories. With such a modified arrangement, the storage counter or the reading counter would include two counters, one for the lines and the other for the columns.

In the course of the reading process of one of the memories A' or B' the binary words successively provided by the lead groups 53 and 54 are respectively applied to two fixed echo cancellation circuits 24 (FIG. 3). One of these is associated with the signal Ss and the other with the signal Sc. Those cancellation circuits are, for example, of the type using delay lines. Since the time intervals (pulse repetition periods) between transmitted pulses is variable however, the weighting coefficients of the delay line output signals must be variable if a good elimination of the fixed echoes is desired. Various cancellation circuits having variable coefficients have been described in French Patent 69 20061 issued Feb. 15, 1971. In the circuits described in this French patent, the time available for a multiplication was very short (about 1 microsecond), so that it had to be performed by semi-digital, semi-analogue means. In the present patent, due to the sorting already done, the time available for a multiplication is, in the specific example hereby described, on the order of 512 microseconds. Thus entirely digital means may be used in the instrumentation of the present invention.

The output signals of the cancellation circuit 24 (FIG. 3) which are in analogue or binary form are applied to a circuit 25 which evaluates frequency spectrum of the said signals and determines the Doppler frequency of the signal returned from each selected range interval. By way of example, it will be assumed that the circuit 25 is computing the Fourier transform of the received signal in accordance with the teachings of French patent 70 14789 issued Dec. 3, 1971.

The circuit 25 provides a signal whose amplitude versus time represents the signal spectrum of the signal which is applied thereto so that the appearance time of the highest amplitude point with respect to a suitably selected origin gives the Doppler frequency value of the analyzed signal. The output signal of the circuit 25 is applied to a threshold circuit 15 followed by a display device 27 which also receives the range increment and bearing codes via an electronic gate 26 which is only opened when the signal provided by the circuit 25 is of greater amplitude than the threshold R1 of the circuit 15.

In a radar receiver, the detection probability PD and the false alarm probability P$fa$ can be used to compute the signal-to-noise ratio of an ideal receiver in decibels R. Due to receiver imperfections, including in particular the degradation introduced by the Fourier transform computer circuit 25, the receiver will have an inherently lower signal-to-noise ratio (R1) higher than R. It should be noted that R1 in decibel is the threshold value introduced at the output of the circuit 25. This output signal, which has a signal-to-noise ratio equal to R, is also applied to the selector set which introduces a degradation of P decibels, such loss mainly resulting from the selector which performs an integration after detection in the staggered or non-uniform PRF situation. In order that the described system should operate properly, it is necessary that the detection probability of the selector set be equal to the detection probability PD obtained at the at the output of the circuit 15 and, in view of that, it is necessary to select for the circuit 13 a threshold value in decibel $R2 = R1 - P$.

While the principles of the above invention have been described in connection with specific embodiments and particular variations thereof, it is to be clearly understood that this description is made by way of example and not as a limitation of the scope of the invention.

What is claimed is:

1. A coherent pulse Doppler radar system including an antenna scanning in the bearing coordinate and receiving means for derivation of sine and cosine receiver phase detector output signals comprising:

sampling and coding means responsive to said sine and cosine phase detector outputs for digitally encoding the amplitude of signal in each of a plurality of range increments during each repetition period of said radar system;

a first memory for discretely storing said range increment codes from said sampling and coding means for each of said sine and cosine signals;

range selector means responsive to one of said sine and cosine outputs of said phase detectors, said means separately sampling the signal in each of said range increments, said range selectors including Doppler filtering to produce an output for each of said range increments in which the received signal includes a Doppler component corresponding to a moving target;

a second memory for discretely storing said range selector outputs by range increment thereby to identify each range increment containing a moving target;

column selection means for contemporaneously reading said first and second memories to produce selected output signals corresponding to each of said sine and cosine signals, said column selection means output signals thereby containing only said digital codes from said first memory in range increments identified in said second memory;

a third memory for storing the output of said column selection means;

canceller means for comparing said codes stored in said third memory for the same range increment over successive repetition periods of said radar system to provide a difference code varying as a function of corresponding target velocity in each of said range increments; and a Fourier transform computer means responsive to said difference code for producing an output signal whose amplitude versus time represents the signal spectrum corresponding to at least one of said moving targets.

2. Apparatus according to claim 1 including display means operated synchronously with said Fourier transform computer to display the spectrum of at least one discrete moving target signal.

3. Apparatus according to claim 2 including a first threshold circuit connected between said Doppler filter in each of the outputs of said range selector means and the corresponding second memory input, to produce a predetermined signal-to-noise ratio improvement.

4. Apparatus according to claim 3 in which a second threshold circuit and a gating circuit is included between the output of said Fourier transform computer and said display, said second threshold circuit and said gate being interconnected to pass only signal amplitudes from said Fourier transform computer exceeding a predetermined amplitude level, the threshold levels of said first and second threshold circuits being selected to provide substantially equal theoretical probabilities of detection.

5. Apparatus according to claim 4 further defined in that means are applied to said column selection means for enabling said selector only during a predetermined sector of said antenna scan in the bearing coordinate, thereby limiting storage of signals in said third memory to those in a predetermined angular sector of the scan coverage of said antenna.

* * * * *